United States Patent [19]

Margolis et al.

[11] 4,201,468
[45] May 6, 1980

[54] METHOD AND APPARATUS FOR DOPPLER FREQUENCY MODULATION OF RADIATION

[75] Inventors: Jack S. Margolis, Pasadena; Daniel J. McCleese, Los Angeles; Michael S. Shumate, Pasadena; Clay H. Seaman, Glendale, all of Calif.

[73] Assignee: California Institute of Technology, Pasadena, Calif.

[21] Appl. No.: 957,452

[22] Filed: Nov. 3, 1978

[51] Int. Cl.$^2$ .............................................. G01P 3/36
[52] U.S. Cl. .................................... 356/28.5; 350/6.5; 350/6.6; 350/294
[58] Field of Search ................ 356/28, 28.5, 346, 349; 350/6.5, 6.6, 294

[56] References Cited

U.S. PATENT DOCUMENTS

| | | | |
|---|---|---|---|
| 3,437,954 | 4/1969 | Herriott et al. | 350/294 |
| 3,732,013 | 5/1973 | Hieslmair et al. | 356/28.5 |
| 4,123,145 | 10/1978 | Botcherby et al. | 350/6.6 |

Primary Examiner—S. C. Buczinski
Attorney, Agent, or Firm—Freilich, Hornbaker, Wasserman, Rosen & Fernandez

[57] ABSTRACT

A method and apparatus for frequency modulating radiation, such as from a laser, for optoacoustic detectors, interferometers, heterodyne spectrometers, and similar devices using two oppositely reciprocating cat's-eye retroreflectors to Doppler modulate the radiation. By reciprocally moving both retroreflectors, the center of mass is maintained constant to permit smooth operation at many Hertz. By slightly offsetting the axis of one retroreflector relative to the other, multiple passes of a light beam may be achieved for greater Doppler shifts with the same reciprocating motion of the retroreflectors. A Doppler shift of $2(v/c)\nu$ occurs for each pass where v is the velocity of each retroreflector, c is the speed of light, and $\nu$ is the frequency of radiation.

12 Claims, 6 Drawing Figures

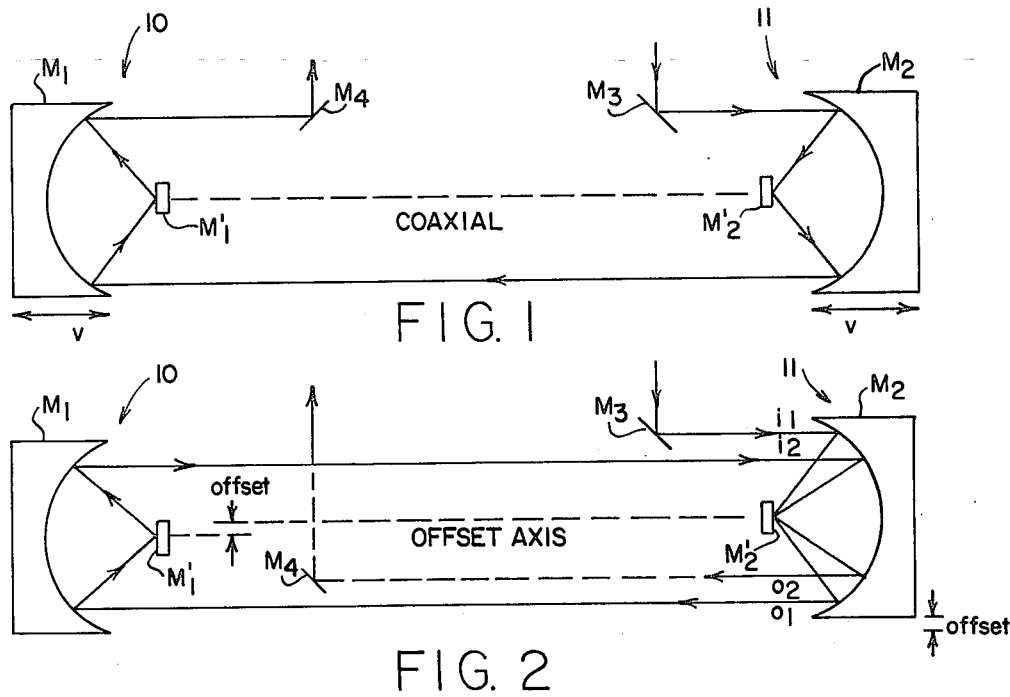
FIG. 1
FIG. 2
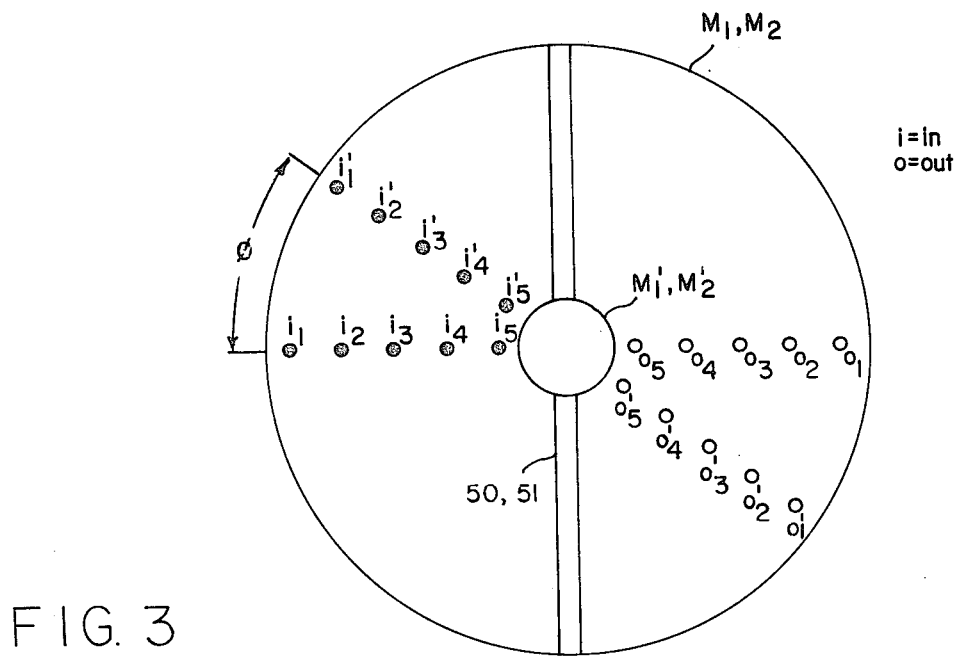
FIG. 3

METHOD AND APPARATUS FOR DOPPLER FREQUENCY MODULATION OF RADIATION

BACKGROUND OF THE INVENTION

This invention relates to a method and apparatus for Doppler frequency modulation of radiation.

Various instruments, such as interferometers, heterodyne spectrometers, FM Lidar (laser radar) optoacoustic detectors and the like, require frequency modulation of radiation, such as a laser beam. In such instruments, one practice has been to impart controlled reciprocating motion to a reflector in the radiation path of the instrument, to thereby Doppler modulate the radiation frequency. The problem has been in obtaining sufficiently high amplitude frequency modulation. Moreover, the single moving mirror is mechanically asymmetric and unbalanced. Frequency modulation of the type required can be supplied by the Doppler modulator herein described.

OBJECTS AND SUMMARY OF THE INVENTION

An object of this invention is to provide frequency modulation of radiation with a minimum of intensity modulation.

A further object of this invention is to provide for large scale frequency modulation of radiation without severe mechanical vibration.

Yet another object is to provide a Doppler radiation modulator which may be applied to the remote measurement of atmospheric winds.

These and other objects of the invention are achieved by reciprocally moving opposing retroreflectors using means to vary the distance between them sinusoidally. The opposing reciprocal motion effectively prevents shifting of the center of mass to avoid any vibration of the instrument using the modulator. By offsetting the axis of one retroreflector relative to the other, a beam may be caused to make multiple passes, thereby multiplying the Doppler modulation by a factor equal to the number of passes. In that manner, the Doppler modulation may be increased by increasing the rate of reciprocating motion, or offsetting the axes of the retroreflectors, or doing both. This Doppler modulation is used with an absorption reference cell in an instrument for measuring remote atmospheric winds by so modulating radiation received from the atmosphere as to cancel Doppler shift in the radiation by the winds. This cancellation is detected by a radiation detector in combination with a minimum (null) or maximum (peak) detector operating on the output of the radiation detector. A minimum detector is used in the case of Doppler modulation of an emission spectrum, and a maximum detector is used in the case of Doppler modulation of an absorption spectrum. The point of minimum or maximum correlation with the reference call yields a measure of wind velocity by reading out the velocity of the reciprocating retroreflectors at the instant of correlation.

The novel features of the invention are set forth with particularity in the appended claims. The invention will be best understood from the following description when read in conjunction with the accompanying drawings.

BRIEF DESCRIPTION OF THE DRAWINGS

FIG. 1 is a schematic diagram of the basic method of the present invention for Doppler modulation of a radiation beam.

FIG. 2 is a schematic diagram illustrating the basic method of FIG. 1 with multiple Doppler modulation passes.

FIG. 3 is a schematic diagram which illustrates an extension of the multiple-pass technique of FIG. 2 to a very large number of passes, and, thereby, a very large variable Doppler shift.

DESCRIPTION OF PREFERRED EMBODIMENTS

Figure 4:
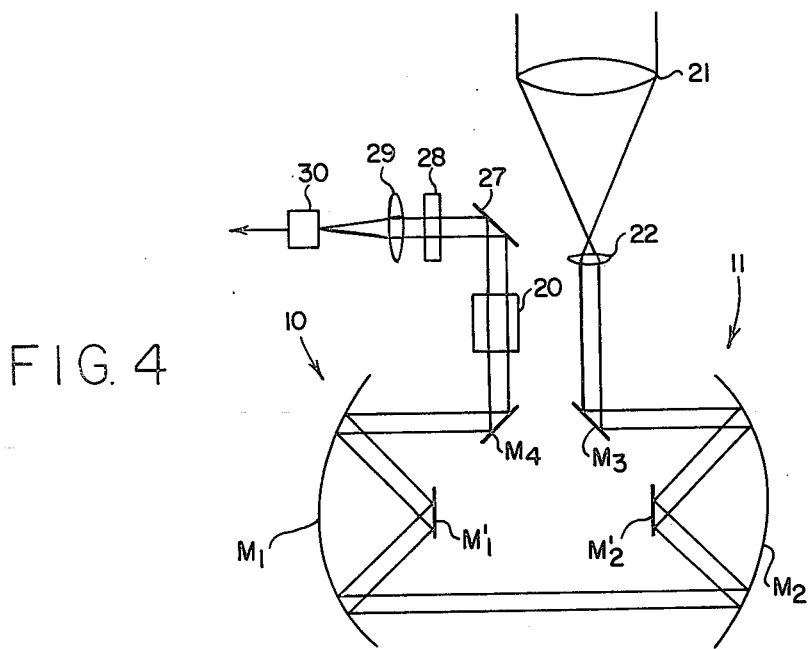
FIG. 4 is a schematic diagram which illustrates the application of the basic method to a technique for remote measurement of atmospheric winds.

Referring now to the drawings, FIG. 1 illustrates a technique for modulating the frequency of a light beam by reciprocally moving two coaxial and opposing "cat's eye" retroreflectors 10 and 11 comprised of primary parabolic reflectors $M_1$ and $M_2$, respectively, mounted to receive an incident beam, parallel to its axis, and small secondary reflectors $M_1'$ and $M_2'$, respectively, mounted to receive an incident beam, parallel to its axis, and small secondary reflectors $M_1'$ and $M_2'$ mounted on the axis and facing the primary reflectors. The distance between the retroreflectors is varied sinusoidally by mechanical means (not shown) for moving the retroreflectors alternately toward each other, and away from each other to Doppler modulate light entering through a reflector $M_3$ and exiting through a reflector $M_4$. As the retroreflectors move toward each other, the frequency of the light beam increases, and as they move away from each other, the frequency decreases.

The motion of the retroreflectors is made symmetrical, i.e., is made to be at the same rate at all times so as to prevent shifting the center of mass. The modulator can then be operated at hundreds of cycles per second with minimal vibration. In that manner, two retroreflectors $M_1$ and $M_2$ engaged in opposing motion Doppler modulates light which enters the system through reflector $M_3$ and is retroreflected and displaced symmetrically about the coaxial optic axis. The beam is then extracted through the reflector $M_4$ with a peak frequency shift of twice $2(v/c)\nu$ where v is the peak velocity of each retroreflector and $\nu$ is the beam frequency. The peak is twice $2(v/c)\nu$ because there are two retroreflectors in motion, and there is a Doppler shift of $2(v/c)\nu$ for each retroreflection.

The foregoing illustrates the basic principle of operation of the invention. Doppler modulation may be enhanced by making the radiation undergo more retroreflections, thereby creating larger Doppler shifts. This can be accomplished by a slight modification of the apparatus, as illustrated in FIG. 2, where light enters at reflector $M_3$, is directed toward retroreflector 11 where it is retroreflected about an axis offset from the axis of retroreflector 10 so that it enters reflector $M_1$ closer to its axis than it was before. The beam is then extracted by the reflector $M_4$ in a new position. Since there have been three retroreflections, the peak Doppler shift is three times $2(v/c)\nu$. The process could be repeated a number of times, i.e., repeated through each retroreflector a number of times, until the beam is displaced so close to the axis of the retroreflectors that the secondary reflectors $M_1$ and $M_2$ occlude the primary reflectors. At that point a set of mirrors may displace the beam and redirect it to a retroreflector at a spot near the edge of the primary reflector, but at some angle $\phi$ about the axis as shown in FIG. 3 where black dots $i_1'-i_5'$ represents spots of entering or incoming light to a retroreflector, and white dots $i_1{}^i-i_5{}^i$ represents spots of exiting light, and the subscripts indicate the order of entering and exiting. The sequences can be repeated again and again, each time displacing the beam by an angle $\phi$. In that manner the extent of peak frequency shift is virtually without limit, although in practice there is a limit since each reflection is less than 100% of the total light in the beam. However, assuming 99.0% reflectivity, and 100 retroreflections, there will still be 37% of the energy left in the beam, a useful amount. A reflectivity of 99% or more is easily achievable over a large part of the IR and visible spectrum.

FIG. 4 illustrates an application of the Doppler modulator of FIG. 1 to an instrument for remote measurement of atmospheric wind velocities, such as from spacecraft for global coverage of large scale meteorological events, but not limited to use on spacecraft. Motion of the instrument will not contribute to the Doppler shift if the instrument field of view is at right angles to the direction of travel; only motion of the wind, and earth's spin, will contribute to the Doppler shift.

The principle of operation of the instrument is closely related to that of the correlation spectrometer, in that spectra of an unknown and a reference are matched. The reference is provided by a gas in a reference cell 20. The spectrum of the gas in the reference cell and the spectrum of the same gas in the atmosphere are correlated both in emission and absorption. A relative velocity between the spectrum of the external gas and the spectrum of the motionless gas in the reference cell will induce a Doppler shifted spectrum which destroys this correlation. If the relative velocity between the reference cell gas and the external gas spectra can be eliminated, the correlation will again be established. The relative velocity can be eliminated by using the modulator of FIG. 1, and taking the modulation required to accomplish that as a measure of the relative velocity of the atmospheric wind.

Lenses 21 and 22 serve to establish the field of view for the instrument, and may be in any conventional telescope. Alternately, a telescope using reflective optics may be employed. The beam exiting the Doppler modulator at the reflector $M_4$ passes through the reference cell 20 and is deflected by a reflector 27 through spectral filter 28 and then focused by a lens 29 onto a detector 30. At some instant in the operation of the Doppler modulator, the Doppler shift due to the relative motion of the instrument and the atmosphere are equal and opposite, and correlation of the reference cell spectrum and the atmospheric spectrum is achieved. Since motion of the instrument is not a factor when the field of view is at right angles to the instrument motion, all of the Doppler shift being cancelled is due to motion of the atmosphere. The linear velocity of the retroreflectors at the instant that the reference and atmospheric spectra are correlated is then a measure of wind velocity.

Figure 5A:
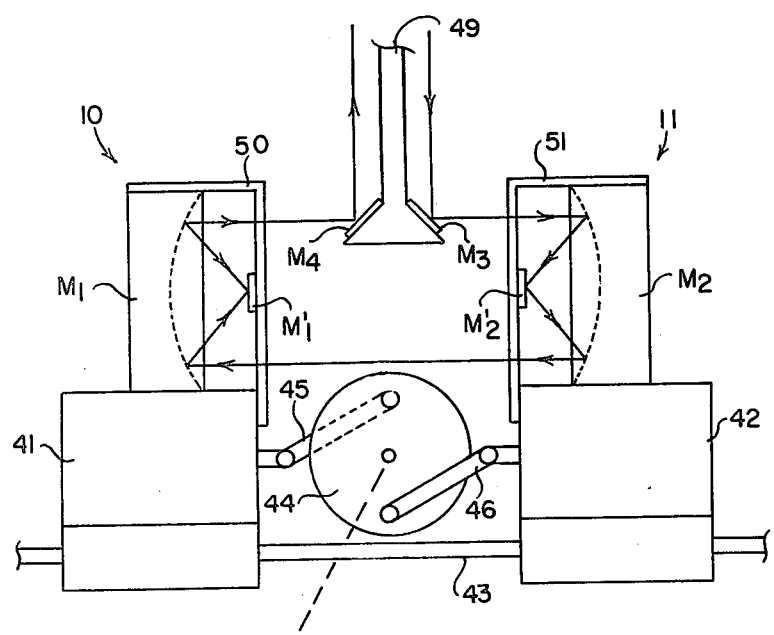
FIGS. 5a and 5b are schematic diagrams illustrating an exemplary implementation of the technique illustrated in FIG. 1.
Figure 5B:
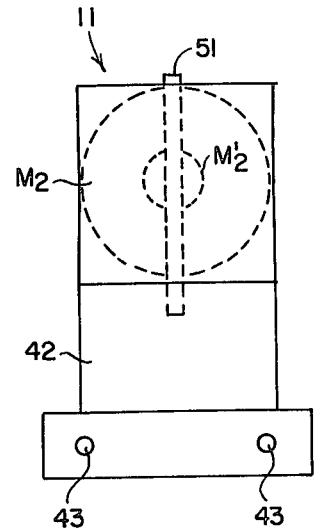

A suitable mechanism which may be used to drive the retroreflector to achieve the appropriate opposing sinusoidal motion is illustrated in FIGS. 5a and 5b. The retroreflectors 10 and 11 are mounted on blocks 41 and 42 which are slidably movable on rails 43. The drive means for moving the blocks symmetrically may consist of a rotating drive wheel 44 and two links 45 and 46 hinged at pins a, b, c and d. The wheel is then rotated at some constant rate by a suitable motor through a suitable gear train represented by a dotted line 48 so designed as to not interfere with the links. The drive wheel thus effectively provides two synchronized cranks for driving the blocks in and out on the rails in opposing directions. The rails are secured to a stationary support frame, as are the mirrors $M_3$ and $M_4$ at the end of small boom 49. Reflectors $M_1'$ and $M_2'$ are secured in position relative to the parabolic reflectors $M_1$ and $M_2$ on inverted L shaped rods 50 and 51. FIG. 5b shows the arrangement in FIG. 5a from a right hand end view.

As noted hereinbefore, Doppler modulation is at all times directly related to the linear velocity of the retroreflectors. Since the linear velocity of each retroreflector depends upon angular position of the rotating drive wheel 44, shaft encoder 52 is used to provide a linear velocity output for the Doppler modulation necessary to cancel out the Doppler shift of incoming radiation due to the motion of the atmosphere relative to the instrument. That output is thus a measure of the radial component of wind velocity, and can be calibrated to read wind velocity in appropriate units, such as knots, miles per hour or feet per second, as required. The correlation between the atmospheric spectrum and reference cell spectrum is simply a minimum in the detector output, in the case of an atmospheric thermal emission spectrum, or a maximum, in the case of an atmospheric absorption spectrum. At the moment of correlation determined by a detector 53, the output of the shaft encoder 52 is read into a register 54 as a measure of wind velocity that needs only suitable scaling.

There is a relationship between the region of the atmosphere sensed, the dimensions of the gas reference cell, and the chemical species selected for the reference cell. The quantities to be considered for a proper experimental design are: The degree of saturation of the spectral lines in the thermal emission spectrum, the wavelength of the thermal emission spectrum, the vertical distribution of the species involved in the thermal emission, the pressure broadened width of the spectral lines, the amount of gas required in the reference cell to produce a proper correlation signal and interfering spectra from other atmospheric constituents. A great variety of gases are available for use in the reference cell, and these include all the isotropic variations of the normal atmospheric gases. An example of possible choices for these parameters for measurement of wind in the earth's atmosphere from a satellite is as follows:

Reference cell gas: $N_2O$, 20 millibars
Reference cell length: 1 centimeter
Bandpass central wavelength: 7.7 microns
Measurement height range: 30–50 kilometers The altitude at which the radial component of wind velocity is determined can be controlled. An indirect way is to filter the light into the Doppler modulator. The detector 30 functions as a radiometer, and as such is designed to be sensitive to thermal emission of the gases in the atmosphere. The radiation emitted in different parts of the emission band appear to come from different parts of the atmosphere according to well known weighting functions. By careful selection of the wavelength used, different altitudes may be probed. Thus a wheel containing filter elements could be used to determine the altitude probed, and to select different altitudes for a thermal altitude profile of wind velocity. The same type of wheel could be used with five reference cells loaded with gas appropriate to the pressure altitudes to be probed. Alternatively, the pressure of a single cell can be altered by using a molecular sieve. However, the sample cell wheel would be preferred in order to have one with no gas to select. The signals derived from using any cell containing gas, and a cell without gas can then be compared (differenced) to provide a measure of the radiation at wavelengths where the spectral lines of the cell and the external gas overlap as a measure of wind velocity.

Although particular embodiments of the invention have been described and illustrated herein, it is recognized that modifications and variations may readily occur to those skilled in the art. Consequently, it is intended that the claims be interpreted to cover such modifications and equivalents.

We claim:

1. A method for Doppler frequency modulating radiation using two opposing retroreflectors and reciprocally moving both retroreflectors towards each other and away from each other, said retroreflectors having their optical axis parallel to each other, using a first reflector to direct radiation from outside a space between said retroreflectors into one of said retroreflectors, and using a second reflector to direct radiation from one of said retroreflectors to outside said space between said retroreflectors.

2. A method as defined in claim 1 wherein the optical axis of one retroreflector is offset from the optical axis of the other retroreflector for multiple retroreflections, thereby to achieve higher Doppler frequency modulation of radiation than would be achieved with a single retroreflection for the same velocity of reciprocal motion of said retroreflectors.

3. A method as defined in claim 2 for remote measurement of atmospheric winds wherein radiation received through said first reflector is from the atmosphere of said winds, and including the step of directing Doppler frequency modulated radiation from said second reflector through a reference cell filled with a gas of known chemical composition and through a spectral filter in series into a detector for detection of correlation between the atmospheric spectrum and reference cell spectrum, and determining the velocity of said retroreflectors at the instant of correlation as a measure of atmospheric winds.

4. A method as defined in claim 3 wherein the chemical composition of said gas in said cell is selected for the particular atmosphere of interest at a predetermined range of altitude above the earth's surface.

5. A method as defined in claim 1 for frequency modulation of radiation by reciprocally moving opposing retroreflectors toward and away from each other to vary the distance between them sinusoidally, wherein said retroreflectors reflecting radiation toward each other with parallel optical axes are provided with the mass of one reciprocating retroreflector equal to the mass of the other to effectively prevent shifting of the center of mass, thereby to avoid any vibration of the instrument.

6. A method as defined in claim 5 wherein the optical axes of said retroreflectors are offset for multiple passes of a beam through different optical paths.

7. A method as defined in claim 6 for remote measurement of atmospheric winds wherein radiation received through said first reflector is from the atmosphere of said winds, and including the step of directing Doppler frequency modulated radiation from said second reflector through a reference cell filled with a gas of known chemical composition and through a spectral filter in series into a detector for detection of correlation between the atmospheric spectrum and reference cell spectrum, and determining the velocity of said retroreflectors at the instant of correlation as a measure of atmospheric winds.

8. A method as defined in claim 7 wherein the chemical composition of said gas in said cell is selected for the particular atmosphere of interest at a predetermined range of altitude above the earth's surface.

9. Apparatus for frequency modulation of radiation comprising
   first and second reciprocating retroreflectors disposed to reflect radiation towards each other, said retroreflectors being arranged with their axes parallel,
   means for reciprocally moving both retroreflectors in synchronism at the same rate over the same distance to periodically vary the distance between them,
   first reflecting means for directing light into one of said retroreflectors from outside a path between said retroreflectors, and
   second reflecting means for directing light out from a path between said retroreflectors.

10. Apparatus as defined in claim 9 wherein the mass of said retroreflectors is substantially the same for both, whereby the center of mass is maintained constant to permit smooth operation.

11. Apparatus as defined in claim 9 wherein said retroreflectors are disposed with their axis offset for multiple retroreflections between said retroreflectors through a plurality of different paths.

12. Apparatus as defined in claim 9 to provide Doppler radiation modulation for remote measurement of atmospheric winds including a radiation detector, a reference cell, and a spectral filter, said reference cell and spectral filter being arranged to pass Doppler modulated light from said second reflecting means into said radiation detector, means for detecting a selected minimum or maximum output of said detector, and means for determining the velocity of said retroreflectors at the instant of detected minimum or maximum as a measure of atmospheric wind velocity.

* * * * *